Figure 1:
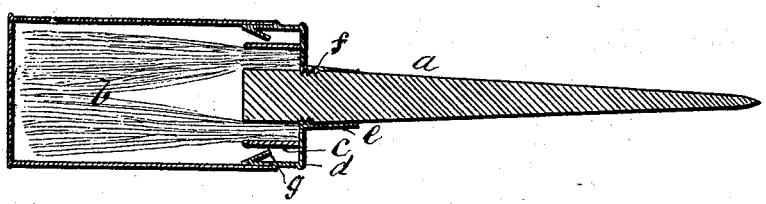

F. HUBBARD.
Paint-Brushes.

No. 151,223.

Patented May 26, 1874.

Witness.
C. H. Douglas
Jeremy W. Bliss

Inventor.
Fredrick Hubbard

UNITED STATES PATENT OFFICE.

FREDRICK HUBBARD, OF EAST BERLIN, CONNECTICUT.

IMPROVEMENT IN PAINT-BRUSHES.

Specification forming part of Letters Patent No. 151,223, dated May 26, 1874; application filed April 14, 1874.

*To all whom it may concern:*

Be it known that I, FREDRICK HUBBARD, of East Berlin, county of Hartford and State of Connecticut, have invented certain new and useful Improvement in Drip-Guards and Receptacle for Paint-Brushes; and to enable others skilled in the art to make and use the same I will proceed to describe it, referring to the drawing, in which the same letters indicate like parts in each of the figures.

The nature of this invention will be understood from the specification and drawing.

Figure 2:
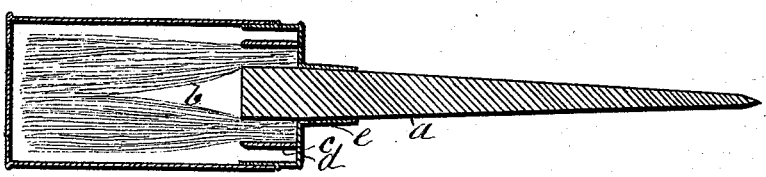

In the accompanying drawings, Figure 1 is a sectional view. Fig. 2 is a section, showing a modification of the same, or having the deflector removed from the inside edge of the cup, and the screw-thread inside of the ferrule for securing the cup to the handle also removed.

$a$ is the handle of the brush. $b$ is the brush material. $c$ is the fastening-band for securing the brush material to the handle in the common way. $d$ is a drip-cup, having a conical-shaped ferrule, $e$, inside of the ferrule; and flush with the bottom of the cup $d$ is a screw-thread, $f$, for the purpose of securing the cup $d$ on the handle, and closely to the base of the brush. $g$ is a deflector or flaring flange, secured inside and close to the edge of the cup $d$, to receive the drip from the brush, and conduct it to the interior of the cup $d$. This cup may be used without the deflector $g$ or screw-thread $f$, as shown in Fig. 2, with nearly or quite as good advantage. $h$ is a brush-receptacle, fitted closely over the cup $d$. Thus, when the brush is not in use, it may be placed into the receptacle, and be inclosed nearly or quite air-tight, and thereby safe and convenient for putting into the pocket.

I am aware of the patents of Ingles and Pinkerton, January 6, 1874, No. 146,183; W. T. Wylie, May 14, 1867, No. 64,732; and the two patents to D. J. Kellogg, dated January 17, 1871, and April 4, 1871, numbered, respectively, 110,978 and 113,305. These I do not claim.

What I claim, and desire to secure by Letters Patent, is—

The screw-ferrule $e$, cup $d$, deflector $g$, in combination with brush $b$ and receptacle $h$, substantially as shown and described.

FREDRICK HUBBARD. [L. S.]

Witnesses:
 C. H. DOUGLAS,
 JEREMY W. BLISS.